Nov. 25, 1969    D. G. LOUKES ET AL    3,480,420
PROCESS AND APPARATUS FOR VACUUM PURIFICATION OF
THE FLOAT GLASS BATH
Filed Nov. 15, 1966    3 Sheets-Sheet 1

INVENTORS
David Gordon Loukes
Alan Edward Hay
BY
Morrison, Kennedy & Campbell
ATTORNEYS

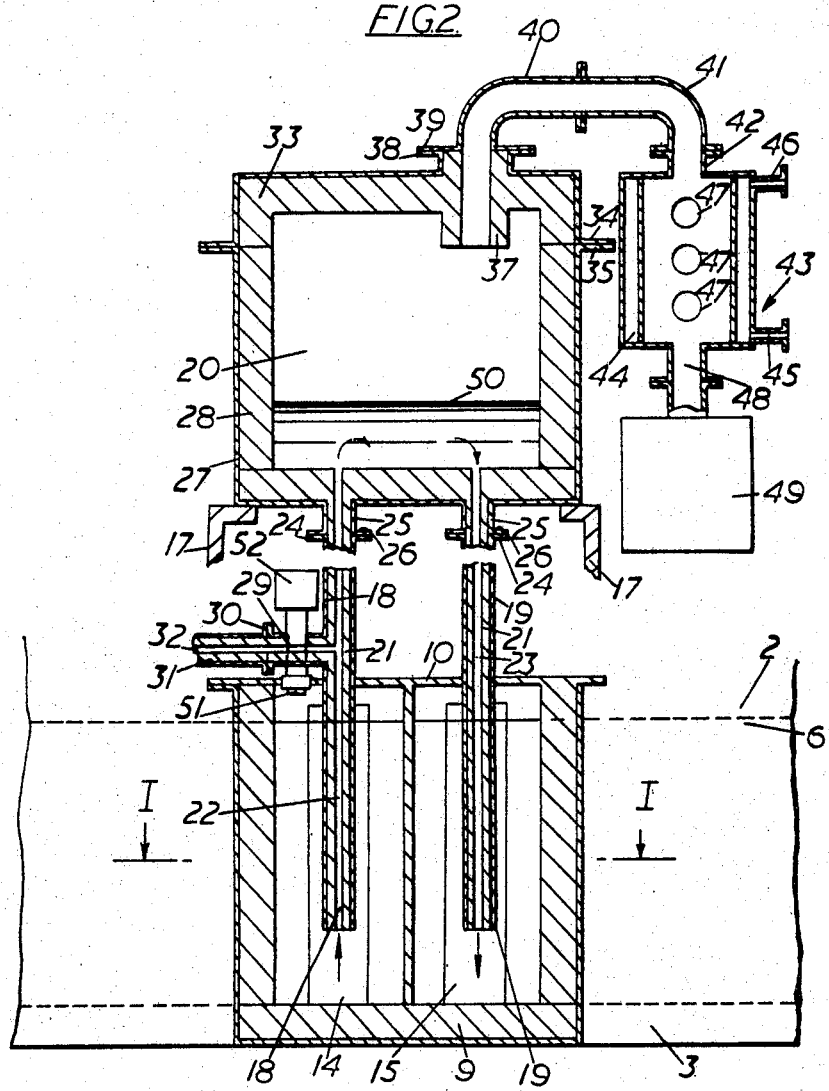

3,480,420
PROCESS AND APPARATUS FOR VACUUM
PURIFICATION OF THE FLOAT GLASS
BATH
David Gordon Loukes, Prescot, and Alan Edward Hay, Ormskirk, England, assignors to Pilkington Brothers Limited, Liverpool, England, a corporation of Great Britain
Filed Nov. 15, 1966, Ser. No. 594,613
Claims priority, application Great Britain, Nov. 24, 1965, 49,997/65
Int. Cl. C03b 18/00
U.S. Cl. 65—27
8 Claims

ABSTRACT OF THE DISCLOSURE

The molten tin supporting a ribbon of flat glass in the float process is purified by circulation through a vacuum chamber where tin impurities volatilize, and the circulation being via a pocket which is divided into an upstream and a downstream part, which parts communicate separately with the main part of the bath.

---

Figure 1:
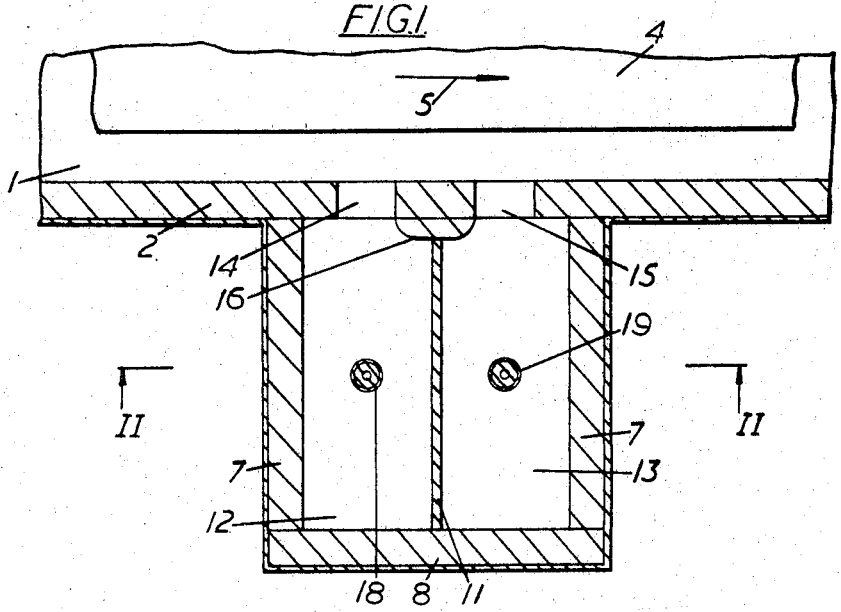

This invention relates to the manufacture of flat glass, and more especially to methods and apparatus for the manufacture of flat glass during which glass is in contact with molten metal, for example methods of manufacturing flat glass during which flat glass in ribbon form is advanced along a bath of molten metal, preferably a bath of molten tin or of a tin alloy in which tin predominates and which has a specific gravity greater than that of glass.

Impurities, for example oxygen and/or sulphur, may be present in the molten metal, and may for example reach the molten metal either from the headspace over the bath or from the glass delivered to the bath. It is usual to contain the bath of molten metal in an elongated tank structure which is roofed by a tunnel-like structure which defines a headspace over the bath. A protective atmosphere is maintained at a plenum (a greater pressure than that outside the headspace) in the headspace, but products of reaction of the molten metal with impurities such as oxygen or sulphur in the molten metal, may be present in the bath.

It is a main object of the present invention to provide an improved method and apparatus for the continuous purification of the molten metal.

According to the invention there is provided in the manufacture of flat glass during which glass is advanced along a bath of molten tin, the steps of purifying the molten tin by circulating molten tin through a purifying zone, exposing the molten tin to a vacuum in that zone so that tin oxide and/or tin sulphide volatilizes from the molten tin, collecting the voltalilised oxide and/or sulphide and returning the purified tin to the bath.

A preferred method according to the invention in which molten glass is delivered to a bath of molten tin at a controlled rate through an inlet to the bath in order to establish a layer of molten glass on the bath, which layer is advanced in ribbon form along the bath, is characterised by removing from the molten tin in the region of the inlet end of the bath tin oxide and/or tin sulphide as it is formed, by continuously circulating the molten tin from the inlet end of the bath through a purifying zone and back into the bath, and distilling out of the molten tin in the purifying zone any tin oxide and/or tin sulphide present by subjecting the molten tin to a vacuum in that zone.

The vacuum in the purifying zone may be employed to raise molten tin from the bath to the purifying zone, and purified molten tin is recirculated from the purifying zone to the bath.

The circulation of the molten tin of the bath through the purifying zone enables the level of tin oxide and sulphide in the bath to be kept to a minimum.

Molten tin may be extracted from the bath and the purified molten tin returned to the bath at any convenient location along the path, preferably alongside the path of travel of the ribbon of glass along the bath. Pumping or impelling means may be provided for enforcing the flow of molten tin through the purifying zone, and conveniently in a preferred method according to the invention a pocket of molten tin of the bath is defined, and molten tin is raised from the pocket to the purifying zone.

The circulation of the molten tin through the purifying zone may be enhanced according to the invention by dividing the pocket of molten tin into two parts each communicating separately with the bath of molten tin, defining two channels for molten tin respectively extending upwardly from said parts of the pocket of molten tin to the purifying zone, and introducing a non-oxidising gas into one of said channels to lift molten tin from one part of the pocket upwardly through that channel to the purifying zone so that purified molten tin flows from the purifying zone downwardly through the other channel to the other part of the pocket.

In this method where a non-oxidising gas is employed to circulate the molten tin, the low pressure maintained over the molten tin in the purifying zone must be effective to withdraw continuously the gas which bubbles up through the molten tin.

The release of the gas from the molten tin in the purifying zone may result in a spray of molten tin rising from the surface of the molten tin, and this enhances the release of dissolved impurities from the molten tin under the action of the low pressure maintained above the molten tin in the zone. Dissolved gases, as well as oxides or sulphides present in the molten tin are more readily released if the gas is supplied at a rate which causes a spray of molten tin in the purifying zone.

In order to maintain the desired low pressure above the molten tin a vacuum pump is employed with a condenser between the pump and the headspace over the purifying zone so that the volatilized impurities carried by the withdrawn gas are condensed before that gas is discharged through the vacuum pump. Dissolved gases released from the molten tin are discharged through the vacuum pump.

It has been found in practice that the method of the present invention as set out above can satisfactorily maintain the concentration of tin oxide and/or sulphide in the bath of molten tin at a minimum, even by the use of the invention at only one location on the bath. A number of pockets of molten tin may be provided spaced apart down the bath each having associated means for carrying out the purifying process according to the invention so that molten tin may be withdrawn for purification from the whole of the bath of molten tin or a part thereof as appropriate.

Desirably the molten tin is withdrawn from the bath at a location where the temperature of the molten tin is of the order of 850° C. If the molten tin is withdrawn nearer the outlet end of the bath where the temperature may be about 600° C., the tin may be heated in the purifying zone in order to enhance the volatilization of impurities from the molten tin.

Further the invention may include the additional step of contacting the molten tin as it is circulated to the purifying zone with an element with which oxygen and/or sulphur in the molten tin preferentially react to form oxides and/or sulphides which are readily released from the molten tin in the purifying zone.

Carbon is an especially useful element which may react with oxygen in the molten tin to produce carbon monoxide which is readily released from the molten tin in the purifying zone. Phosphorus may also be employed to contact the molten tin as it is circulated to the purifying zone.

Further a purging gas may be bubbled through the molten tin in the purifying zone.

The invention also comprehends apparatus for use in the manufacture of flat glass including an elongated tank structure containing a bath of molten tin, a vacuum tower including two legs immersed in the molten tin of the bath and an upper chamber formed to define a purifying zone for molten tin circulating through the tower, a vacuum pump connected to the upper chamber of the tower through a condenser, and means for causing molten tin to circulate from the bath up one leg into the chamber for purification, and for causing purified molten tin to circulate back into the bath through the other leg of the tower.

The vacuum tower may be a simple tower, the bottom of which is immersed in the molten tin of the pocket and up which the molten tin is forced by the pressure of the plenum of protective atmosphere in the headspace over the bath due to the action of the vacuum pump in reducing the pressure at the top of the tower. A conduit leading from the purifying zone at the top of the tower may re-enter the bath at any desired position to define a smaller or greater recirculation path of molten tin through the bath as desired.

In a preferred apparatus according to the invention the purified molten tin is recirculated back into a segregated part of the pocket of molten tin and then flows from that part of the pocket back into the main part of the bath along which the glass is being advanced. In this preferred apparatus the recess in the tank structure is divided into two parts by a central partition, the tank structure is formed with two channels respectively connecting the two parts of the recess to the main part of the bath of molten tin, and the two legs of the vacuum tower respectively dip into the molten tin in the two parts of the recess.

Desirably the legs of the vacuum tower communicate with the bottom of that chamber and the top of the chamber is connected through a condenser to a vacuum pump, and there is a gas inlet near the bottom of one of the legs for connection to a source of non-oxidising gas which causes said circulation of molten tin through the vacuum tower. The gas may be, for example, hydrogen or carbon monoxide or nitrogen or a mixture of any of these gases.

The apparatus may be used anywhere along the bath of molten tin and the temperature of the molten tin which is purified may be within the range of 1100° C. to 600° C. depending on the position of the recess in the tank structure along the elongated tank structure, although it has been found that the removal of impurities is enhanced if the temperature of the molten tin is above 850° C. It is therefore desirable that the apparatus should have a refractory lining, and according to another feature of the invention the legs and chamber of the tower may have an internal carbon lining. The use of the element carbon as a lining has the added advantage that any dissolved oxygen or sulfur in the molten tin reacts with the carbon as mentioned above, to produce carbon monoxide or carbon sulfide which is readily released from the molten tin in the purifying zone.

In another embodiment of the invention said one leg of the tower terminates in a nozzle near the top of the upper chamber, from which nozzle molten tin is sprayed into the chamber, and below the level of the nozzle the chamber is filled with a packing of Raschig rings through which the sprayed tin falls, and an inlet for purging gas terminates at the surface level of tin in the chamber for delivering purging gas beneath the packing for counterflow upwardly relative to the falling molten tin.

Figure 3:
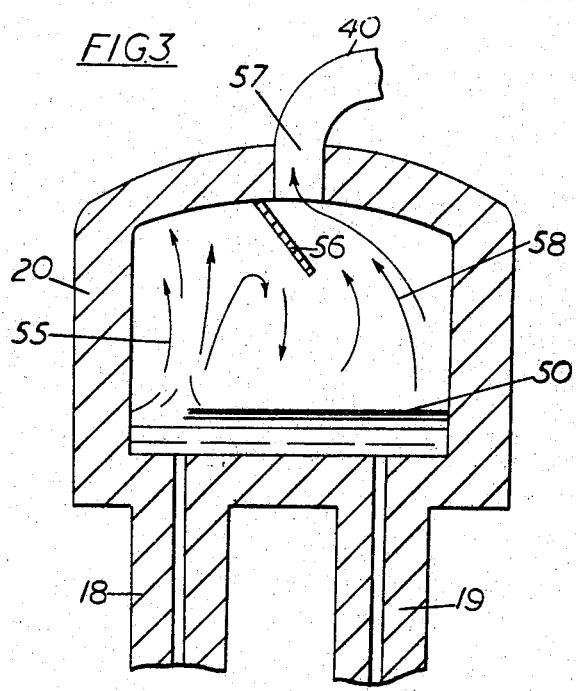
Figure 4:
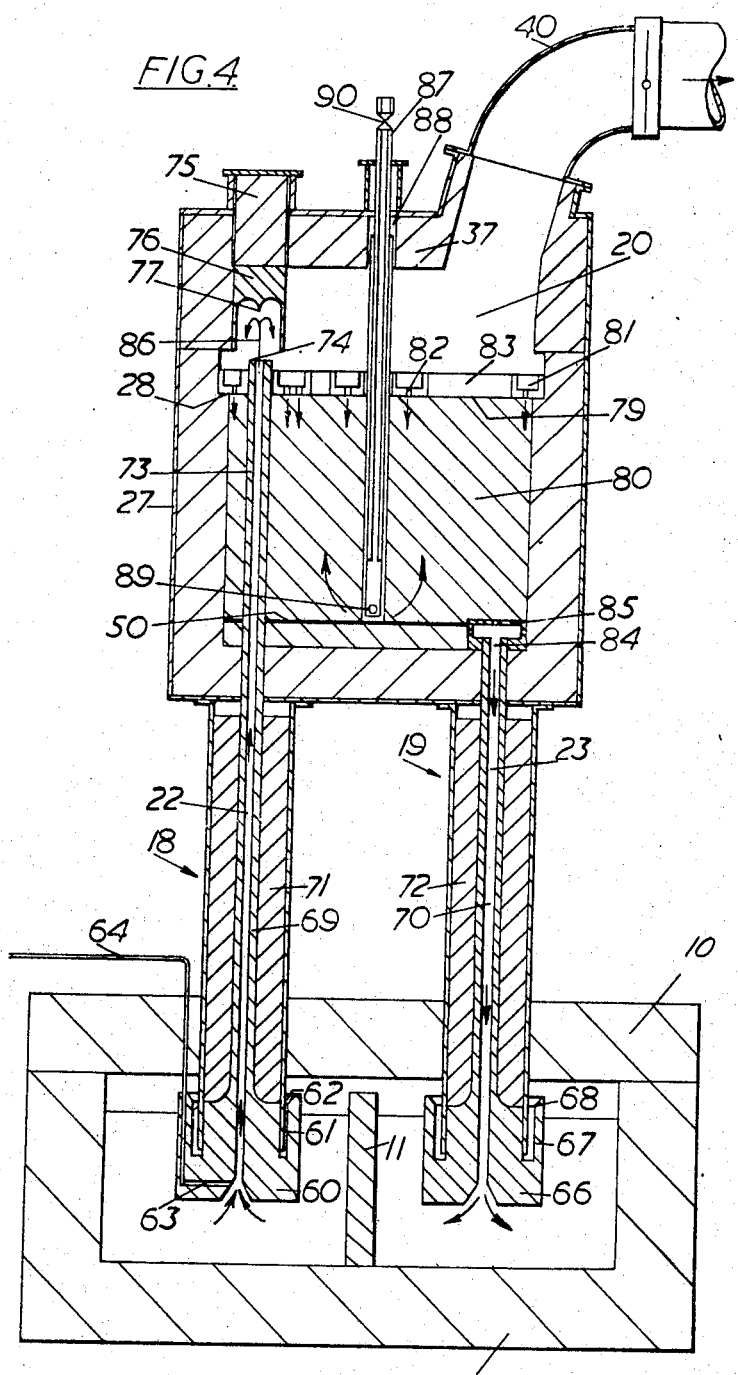

In order that the invention may be more clearly understood some embodiments thereof will now be described, by way of example, with reference to the accompanying drawings in which:

FIGURE 1 is a section through a part of one side wall of a tank structure containing a bath of molten tin, for use in the manufacture of flat glass and showing the formation of a recess in a side wall of the tank structure, which recess holds a pocket of molten tin, this section being on line I—I of FIGURE 2, FIGURE 2 is a vertical section through the recess on line II—II of FIGURE 1 showing apparatus for purifying molten tin, according to the invention, mounted above the recess, FIGURE 3 illustrates a modified design of the apparatus of FIGURES 1 and 2, and FIGURE 4 is a view similar to FIGURE 2 of another apparatus according to the invention.

In the drawings the same references indicate the same or similar parts.

Referring to FIGURES 1 and 2 of the drawings, a bath 1 of molten tin, that is of tin alone, or of an alloy of tin in which tin predominates and which has a specific gravity greater than that of molten glass, is contained in an elongated tank structure including side walls 2 and floor 3. Glass is fed to one end of the bath of molten tin at a controlled rate either in the form of a rolled ribbon of glass which, may undergo a surface treatment as it is advanced along the bath, or a rolled ribbon of glass may be melted on the bath surface in order to establish a layer of molten glass from which a buoyant body of molten glass is formed by permitting unhindered lateral flow of the molten glass in the layer. The buoyant body is then advanced in ribbon form along the bath.

Alternatively a ribbon of glass may be formed on the bath by delivering molten glass on to the bath at a controlled rate and permitting the molten glass so delivered to flow laterally unhindered on the bath as it is advanced to form a buoyant body of molten glass in ribbon form.

A ribbon of glass 4 is advanced along the bath of molten tin 1 towards the outlet end of the bath in the direction of arrow 5, and as the ribbon is advanced along the bath it is cooled until it is sufficiently stiffened to be taken unharmed from the bath through an outlet from the bath, which outlet is defined in the tank structure.

The level of the surface of the molten tin of the bath is indicated at 6 in FIGURE 2 and above the bath of molten tin there is defined a headspace in which a protective atmosphere is maintained at a plenum. The protective atmosphere is a gas which will not react chemically with the tin bath to produce contaminants for the glass, and the protective gas protects the bath surface which is exposed at the sides of the ribbon of glass 5 and under the end of the ribbon which is taken up off the bath surface for discharge through the outlet from the bath. Impurities, for example oxygen and/or sulphur, may however be present in the atmosphere over the bath or may migrate into the bath of molten tin from the glass delivered to the bath, and such impurities react with the molten tin of the bath to form products, for example tin oxide or tin sulphide, which constitute contaminants for the glass.

According to the present invention the presence of such contaminants in the bath of molten tin 1 can be minimised by continuously extracting those impurities from the molten tin of the bath. This continuous extraction of impurities is carried out by circulating molten tin from the bath through a purifying zone in which the molten tin is exposed to a low pressure so that dissolved impurity is released from the molten tin. The purified tin is then returned to the bath. It has been found to be expedient to carry out this purification of the molten tin in the region of the bath, where the temperature of the molten tin is above 850° C., but the invention may be employed for purifying the molten tin at any one or more locations along the elongated tank structure containing the bath. If molten tin to be purified is extracted from the outlet end of the bath where the temperature may be about 600° C., the tin can be heated to about 850° C. in the purifying zone by heaters arranged in that zone.

One such location is illustrated in the drawings, at which location the side wall 2 of the tank structure is formed with a recess containing a pocket of molten tin. The recess is defined by side walls 7, an end wall 8, a floor 9 being a sideways extension of the floor 3 of the tank structure, and a cover 10 which is secured over the top of the side walls 7 and end wall 8.

The pocket of molten tin in the recess is divided into two parts by a central partition 11 extending from the end wall 8 of the recess to the side wall 2 of the tank structure over the whole height of the recess. The two parts 12 and 13 of the pocket of molten tin communicate separately with the main part of the bath respectively through channels 14 and 15 and the part of the side wall 2 of the tank structure between the channels 14 and 15 is specially shaped as indicated at 16 in order to enhance the flow of molten tin into the part 12 of the pocket through the channel 14 and out of the part 13 of the pocket through the channel 15.

A vacuum tower is supported above the recess on a support frame indicated at 17. The vacuum tower has two hollow legs 18 and 19 respectively dipping into the molten tin in the two parts 12 and 13 of the recess. Both the legs 18 and 19 communicate with an upper chamber indicated at 20 which defines a purifying zone in which molten tin from the bath is purified. The legs 18 and 19 are about 1.5 meters long, so that when the pressure in the chamber is reduced to about 1 mm. of mercury by means of a vacuum pump, as described below, a depth of about 15 cm. of molten tin is maintained in the chamber 20 the action of the pressure of the protective atmosphere in the headspace over the bath. Both the legs 18 and 19 are formed of tubular steel sheaths having a thick carbon lining 21 so that there is a bore 22 of about 2.5 cm. diameter up the leg 18 and a similar bore 23 down the leg 19. The outer sheaths of the legs are flanged at 24 near the tops of the legs for connection of the legs to connection pieces 25 having flanges 26 against which the flanges 24 are fixed and which extend downwardly from the outer steel casing 27 of the upper chamber 20.

The chamber 20 also has a thick carbon lining 28 and the bores 22 and 23 communicate through this lining with the interior of the chamber through passages extending up through the bottom of the chamber. The leg 18 which dips into the part 12 of the pocket lying upstream, considered in the direction of movement of the ribbon of glass, is formed with a branch 29 just above the level of the roof 10 of the recess. This branch is also of steel tube having a connection flange 30 and a carbon lining 31 and is for connection to a source of non-oxidising gas which is fed through the bore 32 formed in the carbon lining 31 of the branch pipe 29.

The top of the vacuum tower is closed by a cover 33 having an outer flange 34 which is fixed to a cooperating flange 35 on the lower part of the chamber. The cover 33 is also lined with carbon and is formed with an integral outlet 36 which is also lined with carbon. The carbon lining of the outlet extends downwardly into the interior of the chamber 20 as shown at 37.

The outlet 36 has an upper flange 38 to which is joined the flanged end 39 of a vacuum pipe 40 which is connected by a connection piece 41 to an inlet 42 at the top of a water-cooled condenser 43.

The condenser 43 is of conventional kind and has an outer water jacket 44 which is supplied with cooling water through an inlet 45 at the bottom of the jacket, the water being discharged through an outlet 46 at the top of the jacket. Cooling tubes 47 extend across the interior of the condenser and are in communication with the outer jacket 44. Gas drawn into the condenser through the inlet 42, passes over the tubes 47 before being drawn through the outlet 48 at the bottom of the condenser. This outlet 48 is connected to a vacuum pump 49 of known kind.

When the vacuum pump 49 is operated the pressure is reduced inside the chamber 20 at the top of the vacuum tower to a pressure in the region of about 1 mm. of mercury and this causes molten tin to fill both the legs 18 and 19 under the action of the pressure of the atmosphere over the bath of molten tin, and to rise to a depth of about 15 cm. in the chamber 20. The pressure in the chamber may be as low as 0.01 mm. of mercury. In order to induce a circulation of molten tin from the part 12 of the pocket up the leg 18 into the chamber 20 and then down the leg 19 into the part 13 of the pocket, gas is delivered through the branch pipe 29 at a sufficient rate to carry the molten tin up the leg 18. For example, gas may be delivered through the pipe 29 at a rate of about 7 litres per minute. The gas may be heated to the temperature of the molten tin, and a non-oxidising gas is used, for example an inert gas such as nitrogen, or a reducing gas such as hydrogen or carbon monoxide, or a mixture of any of these three gases.

The molten tin carried up the leg 18 is purified in the chamber 20 and a level, indicated at 50, of molten tin is maintained in the bottom of the chamber 20. Due to the low pressure maintained in the chamber 20 the gas travelling up the leg 18 is released into the chamber from the molten tin and withdrawn by the vacuum pump.

If the delivery of gas through the branch pipe 29 is sufficiently brisk there will be a spray effect at the surface 50 of the molten tin in the purifying zone as the gas bubbles burst from the molten tin. This exposes a greater surface area of the molten tin and so enhances the release of tin oxide and/or sulphide. The gas carrying the impurities is withdrawn through the outlet pipe 40 from the top of the vacuum tower, and the impurities condense in the condenser 43 where they are collected; any dissolved gas, such as hydrogen, being continuously discharged through the vacuum pump.

Since only a certain head of molten tin can be maintained in the chamber 20 under the low pressure in the chamber, purified molten tin flows from the chamber 20 to the downstream part 13 of the pocket by flowing down the leg 19 and then through the channel 15 back into the main part of the bath of molten tin. Thus a continuous circulation of molten tin is set up, contaminated tin being drawn through the channel 14 and up the leg 18 to be purified in the chamber 20 and then returned to the bath through the leg 19 and the channel 15. The molten tin of the bath can be purified in this way at a rate of about 20 tons per hour for example.

Tin oxide and tin sulphide are readily released from the molten tin in this way so that the level of impurities in the tin bath is kept to a minimum, for example at about 2 to 6 parts per million. If a trace of phosphorus is added to the molten tin as it is circulated to the purifying zone, volatile oxides and/or sulphides of phosphorus may also be formed. Phosphorus may be added to the molten tin in the part 12 of the pocket so that the impurities in the molten tin react with the phosphorus before and as the molten tin is being drawn up the leg 18.

Carbon also reacts with impurities in the molten tin to produce easily released compounds and the carbon lining of the apparatus may alone provide a useful reactive surface contact with the molten tin. In addition the surface of the molten tin in the part 12 of the pocket may be covered with a layer of granular carbon to promote the conversion of any dissolved oxygen in the molten tin into carbon monoxide. The legs 18 and 19 may have carbon feet which dip into the molten tin in the pocket, which feet are sealed to the bottom of the legs by seals of low melting point glass.

At higher temperatures, for example of the order of 1000° C. the scavenging of oxygen by carbon may proceed fast enough to avoid the use of a carbon lining in the apparatus. Silicon carbide linings could be used, and carbon lumps floated in the surface 50 of the molten tin in the chamber 20.

In the preferred embodiment described, circulation of the tin is induced by the gas which is bubbled into the molten tin, but in a simpler version of apparatus according to the invention the vacuum tower may be constituted by apparatus up which a single column of molten tin is drawn, for example a 5 foot column of molten tin, by the reduced pressure maintained at the top of tower. The reduced pressure at the top of the tower causes impurities in the molten tin to be continuously volatilized from the surface of the molten tin at the top of the tower. Contaminants such as tin oxide or tin sulphide are thus continuously volatilized from the molten tin, and a conduit is provided connecting the top of the tower back to the pocket of molten tin or directly to the main part of the bath. A paddle wheel or other pumping means must be provided to induce circulation of molten tin through the purifying apparatus.

Gas may be introduced into the bottom of the tower to assist the circulation.

A modified form of the chamber 20 in which the molten tin is purified at the top of the vacuum tower is illustrated in FIGURE 3. The legs 18 and 19 have bores of small diameter so that the gas is released more violently from the surface 50 of the molten tin which is sprayed as indicated at 55 on to the roof of the chamber 20. The roof of the chamber is slightly arched and a baffle 56 extends downwardly from the roof at an angle to protect the outlet 57 from the spray.

Sprayed molten tin falls back into the surface 50 of the molten tin in the chamber 20, and the released impurities are drawn off through the outlet 57, following a path indicated by the arrows 58.

FIGURE 4 illustrates another embodiment of the apparatus according to the invention in which a purging gas is fed into the upper chamber of the vacuum tower in addition to the carrier gas feed which causes circulation of the molten metal from the pocket of molten metal up the leg 18 of he tower.

Each of the legs of the tower is provided with a carbon foot. The leg 18 has a foot 60 fixed to its lower end by the steel casing of the leg being sealed into an annular groove 61 in the top of the foot, by means of a seal 62 of low melting-point glass. A gas feed passage 63 is formed through the foot 60 and is connected externally to the source of non-oxidising gas by means of a feed pipe 64. The other leg 19 of the vacuum tower is also provided with a carbon foot 66 whose upper surface is formed with an annular groove 67 into which the steel casing of the leg 19 fits and is sealed by means of a low melting-point glass 68. The feet 60 and 66 are formed integrally with the lower part of a carbon lining for the bores of the legs respectively indicated at 69 and 70. These linings are fitted within refractory parts 71 and 72 of the legs which are themselves surrounded by the steel casing.

The carbon lining 69 of the leg 18 extends upwardly through the chamber 20 in the form of a carbon nozzle 73. The outlet orifice 74 of the nozzle 73 is near the top roof structure of the chamber 20 and fitted into the roof structure on a support block 75 there is a cusp-shaped splash plate 76. The cusp 77 of the splash plate 76 is located over the outlet orifice 74 of the nozzle.

The surface level of the molten metal in the chamber 20 is indicated at 50, and the chamber 20 is filled up to a level 79 with a Raschig ring packing 80, made of carbon rings. On top of this packing there is fitted a distributor plate 81 extending over the top surface of the packing. There are a number of apertures spaced over the plate 81 through which molten metal, pumped upwardly from the nozzle 73 and distributed over the plate 81, can fall back into the packing 80. Some of these apertures are indicated at 82, and there is a large gas escape outlet 83 in the plate 81 through which purge gas can escape.

The leg 19 of the vacuum tower extends downwardly from the floor level of the chamber 20 and the inlet indicated at 84 to the bore of the leg 19 is protected by a perforated shield 85 so that the molten metal in the chamber can flow readily back down the leg 19 into the pocket of molten metal.

The carrier gas feed on the line 64 causes molten metal to rise up the leg 18 under the action of the high vacuum applied through duct 40 which is connected to the vacuum outlet 37 from the roof of the chamber 20. The molten metal from the pocket rises up the bore 22 of the leg 18 and spurts out of the orifice 74 in the form of a fountain or spray indicated at 86. This spray is projected against the splash plate 76 and as well as there being rapid release of the carrier gas into the evacuated space above the plate 81, volatile materials in the molten metal droplets forming the spray 86 evaporate into the low pressure atmosphere in the chamber 20 and are carried away through the duct 40 under the action of the vacuum pump 49 to the condenser.

In this modified apparatus additional purging of the molten metal is in the Raschig ring packing 80. A purge gas bubbler tube 87 is sealed into an aperture 88 in the roof of the chamber and extends right down through the packing 80 to the level 50 of the molten metal lying in the bottom of the chamber. There are outlet holes 89 in the bottom of the bubbler tube and purge gas escapes through these holes and bubbles up through the packing 80 to give counterflow contact between the molten metal falling down through the packing and the purge gas rising upwardly. The composition of the purge gas may be the same as the carrier gas feed, and the feed of purge gas in controlled by a valve 90.

This increased contact between the gas and the molten metal reduces still further the level of volatile impurities in the molten metal, which impurities are carried away with the purge gas through the outlet opening 83 and eventually to the condenser through the duct 40.

The increased area of gas/metal contact achieved with the apparatus of FIGURE 4 requires the use of a higher capacity vacuum pump, and this capacity may be achieved by coupling two or more pumps to the duct 40 through the condenser. Alternatively, a steam jet ejector may be used in place of a standard type of vacuum pump in order to increase the capacity of the apparatus and thereby increase the rate at which the molten metal of the bath can be trated in the apparatus. If a steam jet ejector is used in place of the standard vacuum pump the condenser 43 may not be necessary, because the condensates from the evaporation do not affect the steam ejector pump and are carried away without having to be condensed.

The invention thus provides an improved method of maintaining the purity of the bath of molten tin or a tin alloy in which tin predominates and which has a specific gravity greater than that of molten glass, along which glass is advanced in ribbon form, thereby minimising the possibility of contaminants entering the underface of the glass from the bath of molten tin.

We claim:

1. In the manufacture of float glass during which a ribbon of float glass is advanced along a bath of molten tin, purifying the molten tin of the bath by defining a pocket of the molten tin outside of and in contact with the bath, the improvement comprising vertically dividing the pocket of molten tin into an upstream and a downstream part over the whole height of said pocket to segregate the molten tin in one of said parts from the molten tin in the other, said parts each communicating separately with said baths of molten tin, continuously channeling molten tin from the bath into the upstream part of the pocket, applying an impelling force to lift the molten tin from the upstream part of the pocket into a purifying zone, maintaining a vacuum in said purifying zone to volatilize tin impurities from the molten tin in said zone under the influence of said vacuum, channeling purified molten tin from said purifying zone into the downstream part of the pocket, and returning said purified molten tin from said downstream part of the pocket to the bath downstream of the upstream intake of molten tin from the bath into the pocket.

2. A method according to claim 1, including the additional step of contacting the molten tin as it is circulated to the purifying zone with an element with which oxygen and sulphur in the molten tin preferentially react to form oxides and sulphides which are readily released from the molten metal in the purifying zone.

3. A method according to claim 1, including bubbling a purging gas through the molten tin in the purifying zone.

4. Apparatus for use in the manufacture of float glass comprising an elongated tank structure containing a main part of a bath of molten tin, a recess outside of and in contact with the bath in the tank structure defining a pocket of the molten tin of the bath, a central vertical partition dividing the recess into an upstream part and a downstream part over the whole height of said recess to segregate the molten tin in one of said parts from the molten tin in the other, two channels in the tank structure separately connecting said parts of the recess to the main part of the bath of molten tin, a vacuum tower including two legs which dip into the molten tin, one leg in the upstream part and the other leg in the downstream part of said recess, and including also an upper chamber into which the upper ends of the two legs open, a vacuum pump connected to said upper chamber of the tower through a condenser, and gas injection means in the leg in the upstream part for causing molten tin to circulate from said part of the pocket up that leg into the chamber for purification, the other leg conducting purified molten tin back into the downstream part of the pocket.

5. Apparatus according to claim 4, wherein the legs of the vacuum tower communicate with the bottom of the chamber and the top of the chamber is connected through a condenser to a vacuum pump, and means defining a gas inlet near the bottom of said one of the legs for connection to a source of non-oxidising gas which causes said circulation of molten tin through the vacuum tower.

6. Apparatus according to claim 4, wherein the legs and chamber of the tower have an internal carbon lining.

7. Apparatus for use in the manufacture of float glass comprising an elongated tank structure containing a main part of a bath of molten tin, a recess outside of and in contact with the bath in the tank structure defining a pocket of molten tin of the bath, a central vertical partition dividing the recess into an upstream part and a downstream part over the whole height of said recess to segregate the molten tin in one of said parts from the molten tin in the other, two channels in the tank structure respectively connecting said parts of the recess to the main part of the bath of molten tin, a vacuum tower including two legs which dip into the molten tin, one leg into the upstream part and the other leg into the downstream part of the recess, and including also an upper chamber into which the upper ends of the two legs open, a vacuum pump connected to said upper chamber through a condenser, gas injection means in the leg in the upstream part for causing molten tin to circulate from said part of the pocket up that leg into the chamber, a nozzle forming a termination of that leg near the top of the upper chamber from which nozzle molten tin is sprayed into the chamber, a packing of Raschig rings filling the chamber below the level of the nozzle, through which packing the sprayed tin falls, means defining an inlet for purging gas terminating at the level of the tin in the chamber to deliver purging gas beneath the packing for counterflow upwardly relative to the falling molten tin, and means defining an outlet from the chamber connected to the downstream leg to conduct purified molten tin from the chamber back into the other part of the pocket.

8. Apparatus according to claim 7, including a cusp-shaped splash plate mounted above the nozzle so that the cusp of the splash plate is located over the outlet orifice of the nozzle.

References Cited
UNITED STATES PATENTS 3,019,275  1/1962  Lorenz _____ 13—31
3,305,337  2/1967  Loukes et al. _____ 65—99 X
3,337,319  8/1967  Edwards _____ 65—99 X S. LEON BASHORE, Primary Examiner E. R. FREEDMAN, Assistant Examiner U.S. Cl. X.R.

65—32, 65, 99, 182, 168; 75—85, 93